Feb. 10, 1959 P. T. VAN DOREN 2,872,825

FACSIMILE SCANNER

Filed Aug. 4, 1954 2 Sheets-Sheet 1

INVENTOR.

PHILLIP T. VAN DOREN

BY

Hudson, Boughton, Williams, David & Hoffmann

ATTORNEYS

INVENTOR.
PHILLIP T. VAN DOREN
BY
Hudson, Boughton,
Williams, David & Hoffmann
ATTORNEYS United States Patent Office 2,872,825

Patented Feb. 10, 1959

2,872,825

FACSIMILE SCANNER

Phillip T. Van Doren, Falls Church, Va., assignor, by mesne assignments, to Calvin K. Clauer, Chicago, Ill.

Application August 4, 1954, Serial No. 447,734

6 Claims. (Cl. 74—56)

The present invention relates to facsimile scanners for use in both transmitting and recording operations and, more particularly, to the mechanism for controlling the movement of the scanning elements. In its broad aspect, the invention is applicable to any repetitive unidirectional scanning procedure or apparatus, including systems such as those known as sonar and radar.

In facsimile scanners, scanning elements of a desired form, such as an electrode of an appropriate type, a stylus or an appropriate optical device, are moved in spaced relationship across a web or sheet of paper while the web is being fed past the scanning element. If at least two such scanning elements are used and one of the scanning elements is beginning its scanning movement across the web as the other element is finishing its scanning movement, the apparatus is said to have a 100 percent "line-use ratio."

Two facsimile scanners are commonly operated in step with each other, such as sending and receiving facsimile scanners. In this type of operation it is important to maintain the proper relationship between the scanning elements of the associated facsimile scanners and to minimize any errors introduced by the mechanism which controls the movement of the scanning elements.

It is also desirable to have a simple, compact scanner which may be mounted on a desk or other place where a large amount of space is not available, as well as one which requires little maintenance.

Therefore, an important object of the present invention is the provision of a new and improved facsimile scanner of a simple and compact form which shall require little maintenance, and which minimizes rotational errors occurring in the mechanism for moving the scanning elements of the scanner.

Another object of the present invention is to provide a new and improved facsimile scanner in which the scanning elements are guided and actuated by the cooperative action of a guide track and a helical cam element, and in which rotational errors in the control mechanism are divided by the number of turns of the helical cam element.

A further object is to provide such a facsimile scanner in which the guide track and cam element are carried by relatively rotatable coaxial members, of which one member is a hollow cylinder and the other member is a cylinder coaxially disposed in the hollow cylinder.

Yet another object of the present invention is the provision of a new and improved facsimile scanner in which the scanning elements are moved along the scanning path by a helical cam or thread means of one directional pitch or characteristic and are returned to the adit end of the scanning path by a helical cam or thread means of an opposite hand or pitch characteristic, the scanning elements moving only in one direction along the scanning path.

Still another object of the present invention is the provision of a new and improved facsimile scanner wherein the scanning element is moved along an endless guide track.

Other objects and advantages of the invention will be apparent from the following detailed description of one practical form of the invention, reference being made to the accompanying drawings forming a part hereof and wherein.

Figure 1:
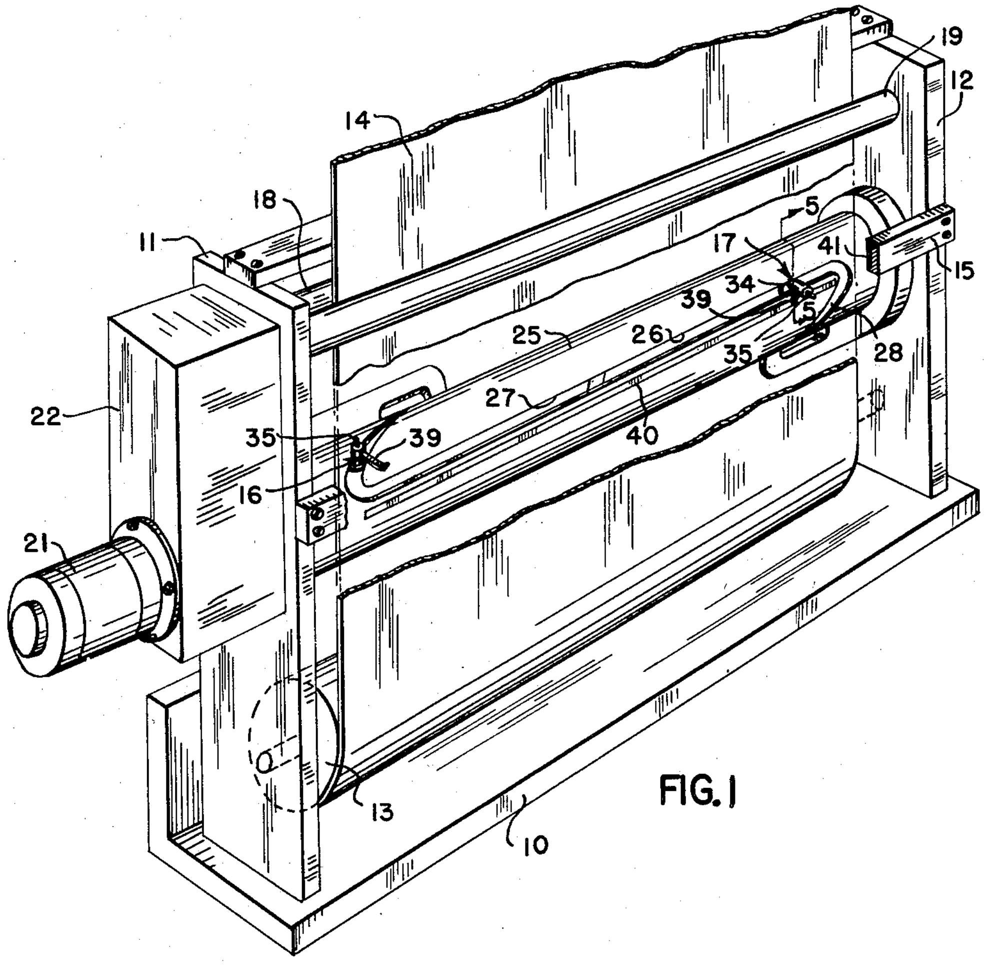
Fig. 1 is a perspective view of a facsimile scanner embodying the present invention.
Figure 2:
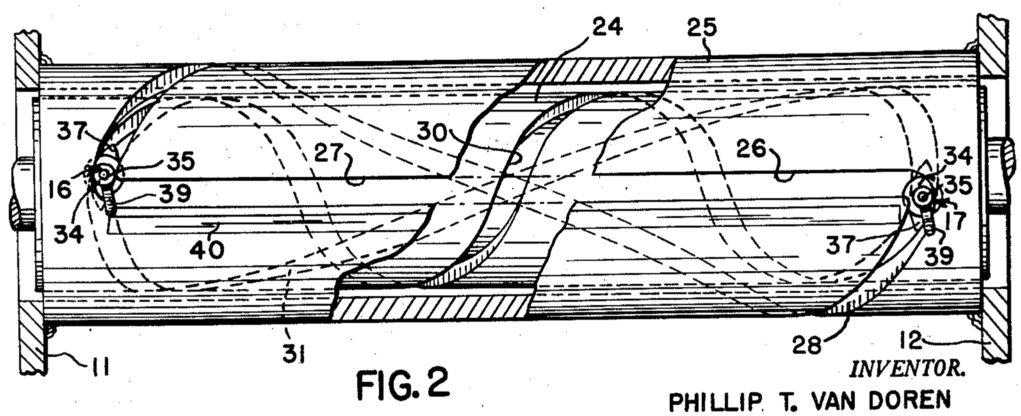
Fig. 2 is mainly an elevational view with portions cut away showing the mechanism for controlling the movement of the scanning elements.
Figure 3:
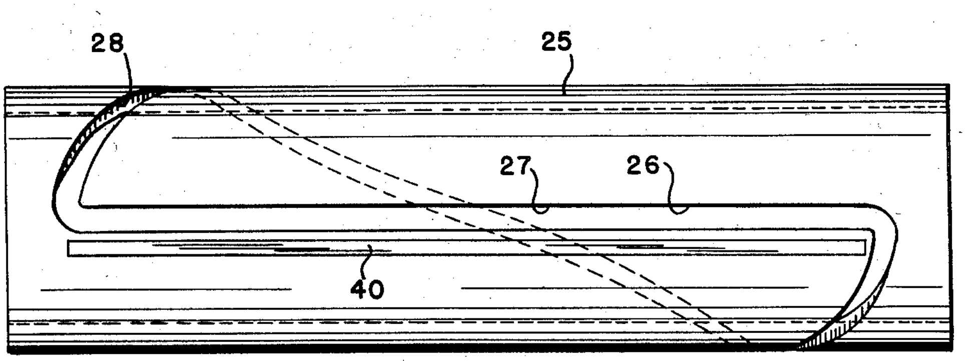
Fig. 3 is a detailed view of the guide track as used in the scanner of Fig. 1.
Figure 4:
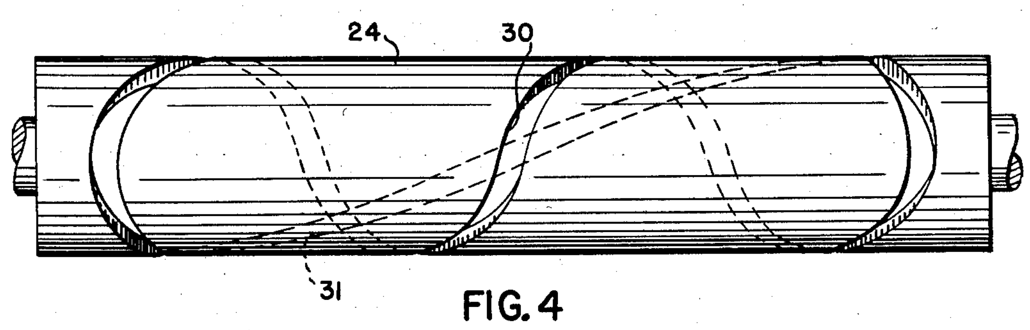
Fig. 4 is a detailed view of the helical cam means utilized in the scanner of Fig. 1 for moving the scanning elements along the guide track.
Figure 5:
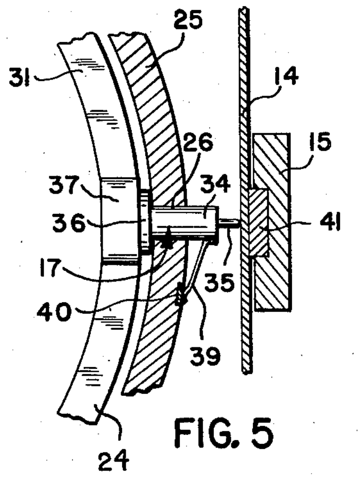
Fig. 5 is a fragmentary sectional view on a larger scale and taken approximately on section line 5—5 of Fig. 1.

Referring to the drawings, the facsimile scanner illustrated therein and embodying the present invention generally comprises a base 10 having opposite vertical uprights 11, 12 forming a frame to support the operating mechanism of the facsimile scanner. A roll 13 of paper 14, or other suitable web material, is adapted to be supported intermediate the uprights 11, 12 adjacent the base 10. The paper 14 is drawn from the roll 13 and fed intermediate a platen 15 and scanning elements 16, 17 by a power-driven feed roll 18 supported intermediate the uprights 11, 12 adjacent the upper ends thereof. The paper 14 passes between the power feed roll 18 and a cooperating idler or backing roll 19 supported alongside the roll 18 by uprights 11, 12.

A motor 21 is mounted on a gear box housing 22 supported on the upright 11, the housing 22 containing gearing for operatively connecting the motor 21 to the feed roll 18 to drive the latter. The housing 22 also contains gearing for operatively connecting the motor 21 to a rotary cam member 24 within a tubular guide member 25 having a track or guide slot 26 therein for guiding the movements of scanning elements 16, 17. The cam member 24 is rotatably journalled in the uprights 11, 12 and the tubular member 25 is supported in a fixed position intermediate the uprights 11, 12.

The guide slot 26 for guiding the scanning elements 16, 17 is endless and includes a straight line portion 27 opposite the platen 15 and defining the scanning path of the elements as they move across the paper 14, and a return slot 28 which joins the opposite ends of the straight line portion 27 of the guide slot. The return slot 28 passes around the tubular member 25 so that opposite ends of the return slot 28 join opposite sides of the straight line portion 27. The motor 21 rotates the cam element 24 to move the scanning elements 16, 17 from right to left, as the scanner is viewed in Fig. 1, and the cam element 24 is such that the direction of rotation of the cam element is the same as the direction of the movement of the scanning elements 16, 17 as the elements leave and enter the straight line portion 27 of the guide slot 26.

The cam member 24, in the illustrated and preferred embodiment, has a cam element comprising a helical cam groove or thread means 30 adapted to move the scanning elements 16, 17 along the straight line portion 27 of guide slot 26 and a helical cam groove or thread means 31 adapted to move the scanning elements along the return slot 28 to transfer the scanning elements from the exit end to the adit end of the straight line portion 27 of guide slot 26. The cam groove 31 is of opposite hand to the cam groove 30. The guide slot 26 can also be referred to as a guide track.

The scanning elements, as illustrated, each comprise a cylindrical holder 34 for an electrode 35, the holder 34 being movably supported by the guide slot 26 and extending therethrough. The inner end of the holder 34 is formed with a shoulder 36 and an elongated base 37 which is adapted to be received by the cam grooves 30, 31 of the cam member 24 and to be moved therealong upon rotation of the member. The base 37 and holder 34 may be said to constitute a follower operating in the cam grooves 30, 31 and the guide slot 26 to control the movement of the scanning element.

To form an endless cam track, the cam grooves 30, 31 are joined at their adjacent ends by end portions which are opposed to the corresponding ends of the straight line portion 27 of the guide slot 26. The angle of lead between the cam grooves and the guide slot 26 at the ends of the straight line portion 27 is zero, so that the elements 16, 17 will be carried from the straight line portion 27 into the return slot 28, or from the return slot 28 into the straight line portion 27, as the case may be. The propelling force for the elements 16, 17 while they are in the zero-lead end portions of the guide slot 26 is provided by the friction between the elements and the cam groove.

Since the return slot 28 passes around the tubular member 25 and the cam member 24, the number of turns of the cam groove 31 will be equal to the number of turns of the cam groove 30 diminished by the number of turns the return groove 28 makes in passing around the tubular member 25. In the present case, the groove 31 has one less turn than the groove 30. The construction and operation of the above-described means for moving the elements 16, 17 maintain the elements in their proper spaced relationship.

Rotational errors occurring in the drive motor 21 or the gear train intermediate the motor and the cam member 24 are divided by the number of turns in the helical cam groove 30. The illustrated embodiment shows the cam groove 30 as a two-turn helix for purposes of illustration. Preferably, the cam groove 30 utilizes approximately 15 turns and the cam groove 31 approximately 14 turns, whereby the rotational errors of motor 21 and its associated gear train are reduced by a factor of 15. In addition to dividing the rotational errors, the cam grooves provide a positive means for maintaining the proper spacing between the scanning elements since the elements are continuously in engagement therewith.

Electrical connection, in the illustrated embodiment, is made to the electrode 35 by means of a spring brush 39 supported on the cylindrical holder 34 and adapted to engage an electrically conductive strip 40 mounted on the tubular member 25 adjacent the straight line portion 27 of the guide slot 26. The spring brush makes contact with the conductive strip 40 as it begins its scanning operation and loses contact with the strip when it enters the return slot 28 to be returned to the adit end of its scanning path.

The cooperating electrode may be a conductive strip 41 supported on the inner side of the platen 15 (see Fig. 1) and may be the expendable electrode if the scanning operation is of the type wherein one electrode is consumed. The recording paper, however, can be either of the electrolytic or voltage breakdown variety, and the scanning electrodes 35 may be vaporized, electroplated into the paper, or otherwise consumed, if means is provided for their replacement.

While the preferred embodiment of the present invention utilizes a helical cam groove in the cam member 24 for moving the scanning elements, it will be understood by those skilled in the art that a lead screw thread could be substituted for the groove, or other suitable helical cam means utilized. Likewise, the return slot 28 has been illustrated as a helical slot, but it will be understood that the particular form of this slot is immaterial so long as it passes around the tubular member 25. Preferably, the scanning elements enter and leave the straight line portion 27 in the direction of rotation of the cam member 24. The invention is also adaptable for use regardless of the number of scanning elements employed, as will be well understood by those skilled in the art.

It may now be seen that the present invention provides a simple, compact facsimile scanner which will require little maintenance. The scanning elements of the scanner are maintained in spaced relationship by the drive mechanism, which is of such a construction that rotational errors in the mechanism are minimized and have little effect on the movement and position of the scanning electrodes.

Although the novel facsimile scanner has been illustrated and described herein to a detailed extent, it will be understood, of course, that the invention is not to be regarded as being limited correspondingly in scope, but includes all changes and modifications coming within the terms of claims hereof.

Having thus described my invention, I claim:

1. In a scanning mechanism, a scanning element; a tubular member having a longitudinally extending endless guide slot therein defining a closed path; a follower movable in said guide slot operatively connected to said element for movement therewith; and rotatable cam means within said tubular member for moving said follower in one direction along said slot and about at least a portion of the periphery of said tubular member, said tubular upon rotation of said cam means, said cam means including a helical cam element of one hand for moving said follower in one direction along said slot with respect to said tubular member and a helical cam element of opposite hand for moving said element in the opposite direction with respect to said tubular member.

2. In a scanning mechanism, a plurality of scanning elements and means for moving said elements in spaced relationship along a predetermined path, comprising a tubular member having an axially extending slot therein defining said path, and a return slot passing around said tubular member and joining the opposite ends of the first said slot, the opposite ends of said return slot joining opposite sides of the first said slot, said scanning elements being supported for movement therealong said slots; and cam means supported within said tubular member for relative rotation with respect to for moving said scanning elements along said slots and comprising a member having a first helical cam for moving said scanning elements in one direction along the first said slot and a second helical cam for moving said scanning elements along said return slot, said helical cams maintaining said elements in a predetermined spaced relationship.

3. In a mechanism, a stationary member having a first guide slot and a second guide slot joining the opposite ends of said first guide slot; an element including a follower supported for movement along said guide slots to guide the movement of said element, said element moving with said follower and said first guide slot guiding the movement of said element along an endless path and said second guide slot returning said element from the exit end to the adit end of said first slot, the opposite ends of said second slot joining opposite sides of said first slot; rotatable thread means of opposite hands for moving said follower along said slots; and means for rotating said thread means.

4. In a scanning mechanism, a tubular member having a first guide slot and a second guide slot passing around said member and joining the opposite ends of said first guide slot; a scanning element including a follower movable therewith and supported for movement along said guide slots to guide the movement of said element, said first guide slot guiding the movement of said element across a path to be scanned and said second guide slot returning said scanning element from the exit end to the adit end of said first slot; and cam means for moving said follower along said slots comprising a first helical cam element for moving said follower along said first guide slot and a second helical cam element for moving said follower along said second slot, said second cam element having a number of turns equal to the number of turns of said first cam element less the number of turns said second slot makes in passing around said tubular member.

5. In a scanning mechanism, a tubular member having a first guide slot parallel to the axis of the member and a second guide slot making a single pass about said member and joining the opposite ends of said first guide slot; a scanning element including a follower supported for movement along said guide slots to guide the movement of said element, said follower being movable with said element and said first guide slot guiding the movement of said element across a path to be scanned and said second guide slot returning said scanning element from the exit end to the adit end of said first slot, the opposite ends of said second slot intersecting opposite sides of said first slot; and cam means within said member for moving said follower along said slots comprising a first helical cam element having $x$ number of turns for moving said follower along the first guide slot and a second helical cam element having $x-1$ number of turns for moving said follower along the second guide slot.

6. In a scanning mechanism, a scanning element and means for periodically moving said element in one direction along a predetermined path comprising a tubular member having a longitudinally extending slot therein defining said path and a return slot passing around said member and joining the opposite ends of the first said slot, the opposite ends of said return slot intersecting opposite sides of the first said slot, said scanning element being movably supported in said slot; rotatable cam means within and coaxial with said tubular member for moving said scanning element along the first said slot comprising a member having first thread means for moving said scanning element in said one direction along the first said slot and second helical thread means for moving said scanning element along said return slot, said second thread means having a number of turns equal to the number of turns of said first thread means less the number of turns said return slot makes in passing around said tubular member; and means for rotating said cam means relative to said tubular member.

References Cited in the file of this patent

UNITED STATES PATENTS

| | | |
|---|---|---|
| 2,445,902 | Bell | July 27, 1948 |
| 2,587,145 | Grib | Feb. 26, 1952 |